LA FAYETTE PIERCE.
CHAMBER VESSEL.
APPLICATION FILED FEB. 10, 1915.
1,181,162.
Patented May 2, 1916.
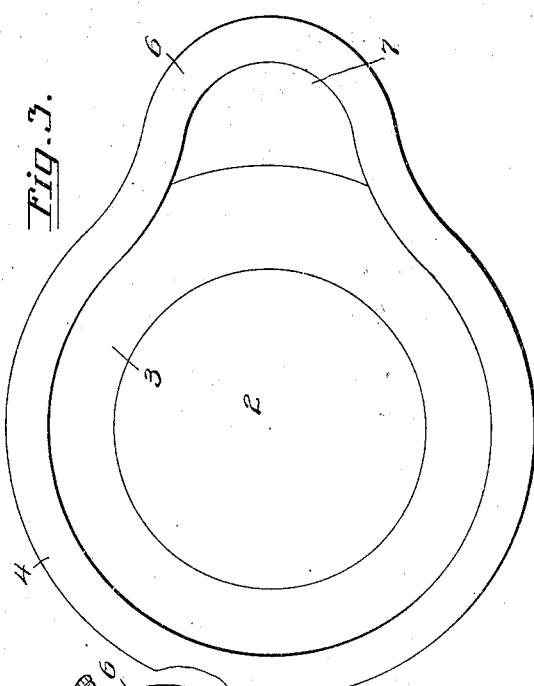
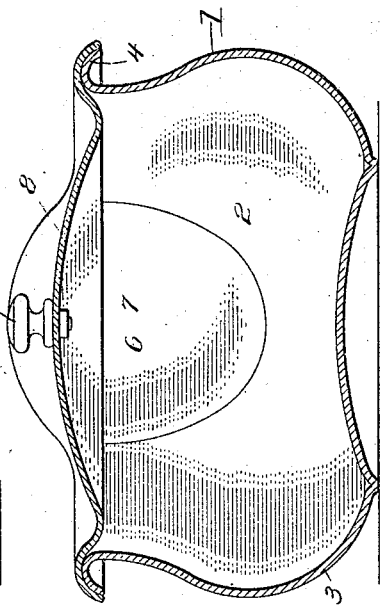
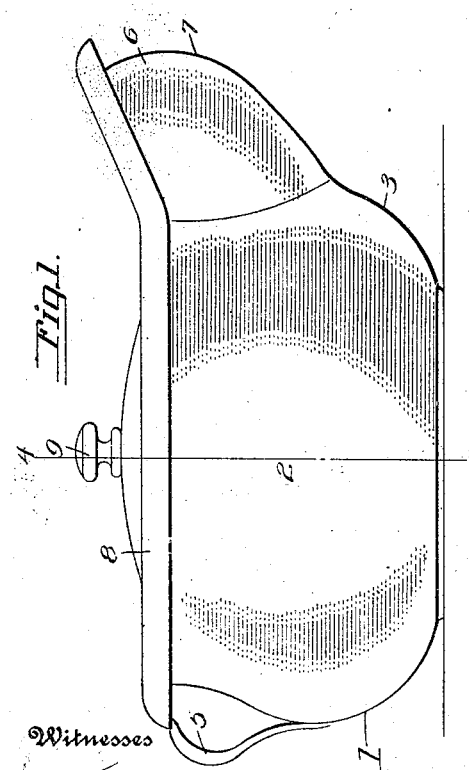
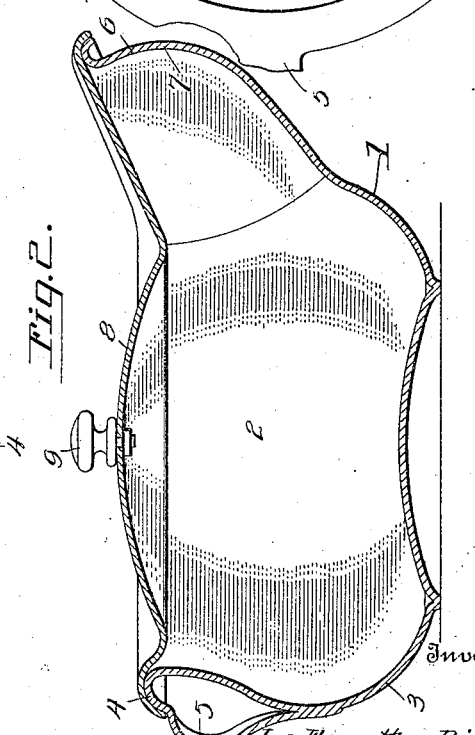
Witnesses
Inventor
La Fayette Pierce.
By Victor J. Evans
Attorney

UNITED STATES PATENT OFFICE.

LA FAYETTE PIERCE, OF FALLON, NEVADA.

CHAMBER VESSEL.

1,181,162.  Specification of Letters Patent.  Patented May 2, 1916.

Application filed February 10, 1915. Serial No. 7,331.

*To all whom it may concern:*

Be it known that I, LA FAYETTE PIERCE, a citizen of the United States, residing at Fallon, in the county of Churchill, and State of Nevada, have invented new and useful Improvements in Chamber Vessels, of which the following is a specification.

The present invention relates to improvements in the construction of chamber-vessels.

In carrying out my invention I propose to provide an article of this class which shall be simple, cheap and sanitary.

It is also my aim to construct a chamber vessel for use of both sexes which is provided with an extension or spout of a peculiar formation which projects a suitable but convenient distance above the top of the vessel and has its upper edge rolled and inclined to the rolled edge of the vessel proper, the said extension or spout providing a baffle so that the urine of either sex cannot be accidentally directed over the top of the vessel but will be guided by the spout of the vessel proper.

A further object of the invention is to form the vessel with an extension or spout which is arranged diametrically opposite the handle of the vessel, the said spout being gradually bulged outward from the base of the vessel to the top thereof, thus increasing the capacity of the vessel as well as providing the said vessel with a baffle or directing member which will prevent splashing of the urine as the same is delivered into the vessel.

A still further object of the invention is to construct a chamber-vessel having an outlet or directing spout which is so connected with the vessel as to leave no projections or angular parts which will interfere with the free passage of the contents of the vessel through the spout when the vessel is to be emptied; and to further provide a flanged closure for the vessel which so snugly fits the same as to prevent the escape of odors from the vessel.

With the above and other objects in view, the improvement resides in the construction, combination and arrangement of parts set forth in the following specification and falling within the scope of the appended claim.

In the drawing: Figure 1 is a side elevation of a chamber vessel constructed in accordance with the present invention, Fig. 2 is a central longitudinal sectional view through the same, Fig. 3 is a top plan view of the same, the cover being removed, and Fig. 4 is a horizontal sectional view approximately on the line 4—4 of Fig. 1.

Referring now to the drawings in detail, the numeral 1 designates a vessel constructed in accordance with the present invention. This vessel may be constructed of any desired material and in various sizes and proportions for the convenience of the various persons having use for the same. The vessel includes a body 2, which is preferably bowled or dished outwardly from its bottom, as indicated by the numeral 3, and is from thence curved inwardly and extended outwardly at its upper portion, the terminal of said curved portion providing the top of the vessel with a continuous rounded flange 4. Preferably formed integral with the flange 4 and forming a continuation of the said flange is a handle 5. Arranged diametrically opposite the handle 5 and made integral with the body 2 is a spout or extension 6. The upper edge of the spout projects a suitable distance above the top of the vessel proper, and the flange 4 is continued around the upper edge of the spout, and the said upper edge inclines gradually from its outer portion to its connection with the sides of the vessel. The spout has its outer wall bulged or curved outwardly, as indicated by the numeral 7 and from thence is curved gradually inwardly to its connection with the lower and rounded portion of the body 2.

The numeral 8 designates a closure which is shaped to conform to the shape of the top of the vessel, the said closure having a continuous flange which overlies and snugly engages the top flange of the vessel, and the closure is, of course, provided with a suitable handle 9 whereby the same may be arranged upon the vessel or removed therefrom as desired.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

A chamber vessel including a body provided with a lower outwardly bulged portion, an upper inwardly bulged portion terminating in an outturned curved flange, said flange being continued and connected with the body of the vessel to provide a handle, the said body diametrically opposite the handle being provided with an extension forming a spout, the said spout being inclined outwardly from its connection with the lower portion of the vessel and then curved inwardly at its top and provided with an outturned flange forming a continuation of the top flange of the vessel, the upper edge of the said spout being arranged centrally a distance above the flanged top of the vessel and the sides of said spout being gradually inclined and the side edges of the spout being gradually inclined toward the top of the vessel proper, and a cover having a flanged edge forming the upper flanged top of the vessel and spout.

In testimony whereof I affix my signature in presence of two witnesses.

LA FAYETTE PIERCE.

Witnesses:
W. P. CLARK,
A. R. JEFFREY.